US009205786B2

(12) United States Patent
Takayama

(10) Patent No.: US 9,205,786 B2
(45) Date of Patent: Dec. 8, 2015

(54) MOLDING FOR VEHICLE AND METHOD FOR ATTACHING SIDE WINDOW WITH MOLDING ATTACHED

(75) Inventor: Mitsuhiro Takayama, Matsusaka (JP)

(73) Assignee: Central Glass Company, Limited, Ube-shi (JP)

( * ) Notice: Subject to any disclaimer, the term of this patent is extended or adjusted under 35 U.S.C. 154(b) by 0 days.

(21) Appl. No.: 14/234,488

(22) PCT Filed: Jul. 26, 2012

(86) PCT No.: PCT/JP2012/068908
§ 371 (c)(1),
(2), (4) Date: Jan. 23, 2014

(87) PCT Pub. No.: WO2013/018631
PCT Pub. Date: Feb. 7, 2013

(65) Prior Publication Data
US 2014/0145463 A1     May 29, 2014

(30) Foreign Application Priority Data

Aug. 2, 2011  (JP) .................................. 2011-169386

(51) Int. Cl.
*B60R 13/04* (2006.01)
*B60J 10/00* (2006.01)
(Continued)

(52) U.S. Cl.
CPC ............. *B60R 13/04* (2013.01); *B60J 10/0014* (2013.01); *B60J 10/0071* (2013.01); *B60J 10/0091* (2013.01); *B60J 10/02* (2013.01); *B62D 65/06* (2013.01); *Y10T 29/49826* (2015.01)

(58) Field of Classification Search
CPC .............. B60J 1/007; B60J 1/10; B60J 10/06; B60R 13/04; B60R 13/043; B60R 13/06; B62D 25/04

USPC ............ 296/1.08, 146.9, 146.15, 201; 49/502
See application file for complete search history.

(56) References Cited

U.S. PATENT DOCUMENTS 5,261,721 A * 11/1993 Conger et al. ............ 296/146.15
5,772,277 A *  6/1998 Fukuda ......................... 296/201
(Continued)

FOREIGN PATENT DOCUMENTS

JP        60-191523 U    12/1985
JP        10-35272 A      2/1998
(Continued)

OTHER PUBLICATIONS

International Search Report with English translation dated Sep. 4, 2012 (5 pages).
(Continued)

*Primary Examiner* — Jason S Daniels
(74) *Attorney, Agent, or Firm* — Crowell & Moring LLP

(57) ABSTRACT

Disclosed is a molding that is attached to a front side edge portion of a side window of a vehicle and covers only a bottom surface or the bottom surface and a side surface of the side window, the molding being formed with a door lip for covering an inclined portion of a body opening portion between a glass attachment surface of the body of the vehicle, to which the side window is attached, and a flat portion of the body opening portion, to which a door of the vehicle is attached, the molding being characterized by that a tip portion of the door lip of the molding is bent towards the inclined portion of the body opening portion to form a body abutment portion. This molding can be attached without increasing the operation man-hour when assembling the body and can be prevented from coming off the side window.

7 Claims, 2 Drawing Sheets

(51) Int. Cl.
*B60J 10/02* (2006.01)
*B62D 65/06* (2006.01)

(56) References Cited

U.S. PATENT DOCUMENTS

| | | |
|---|---|---|
| 6,017,038 A | 1/2000 | Wato et al. |
| 2008/0012388 A1* | 1/2008 | Kinoshita et al. ............. 296/201 |
| 2008/0073939 A1* | 3/2008 | Arai et al. ..................... 296/201 |
| 2009/0072581 A1* | 3/2009 | Rich et al. ................... 296/146.9 |
| 2011/0241370 A1* | 10/2011 | Alvarez et al. ............... 296/1.08 |
| 2012/0205940 A1* | 8/2012 | Sitterlet et al. ........... 296/146.15 |

FOREIGN PATENT DOCUMENTS

| | | |
|---|---|---|
| JP | 11-19951 A | 1/1999 |
| JP | 2002-347438 A | 12/2002 |
| JP | 2007-161080 A | 6/2007 |
| JP | 2007-223405 A | 9/2007 |
| JP | 2010095167 A * | 4/2010 |
| WO | WO 2010/050259 A1 | 5/2010 |

OTHER PUBLICATIONS

Supplemental European Search Report dated Jul. 2, 2015 (Seven (7) pages).

* cited by examiner

Prior Art

MOLDING FOR VEHICLE AND METHOD FOR ATTACHING SIDE WINDOW WITH MOLDING ATTACHED

TECHNICAL FIELD

The present invention relates to a molding that is attached to a front side edge of a side window that is fixed to a side window attachment portion of a vehicle, and a method for attaching the same to a vehicle body.

BACKGROUND OF THE INVENTION

In some cases, a molding is attached to a peripheral portion of a side window that is fixed to a side window attachment portion of a vehicle. In case that a molding has been attached to a front side edge of the side window, there is proposed a molding formed with a door lip for covering an inclined portion formed at a step between a glass attachment surface of a body of the vehicle and a body opening portion positioned on the inner side of the body, for the purpose of improving the beauty (Patent Publication 1).

The molding mentioned in Patent Publication 1 has a structure for covering the bottom surface, the side surface and the top surface of the side edge portion of the side glass plate. Furthermore, the molding is formed with a clip for conducting a temporary tacking to the body.

In a molding formed with a door lip for covering the inclined portion between the glass attachment surface of the body and the body opening portion, similar to the molding that is attached to the front side edge portion of the side window described in Patent Publication 1, when the door is closed, a weather strip that is attached to a peripheral portion of the door panel of the door is in abutment with the door lip and presses the door lip, thereby generating a force to lever up a glass support member covering the side window of the molding toward the outside of the vehicle. However, since the molding is formed with a clip for conducting a temporary tacking to the body, the molding is not removed from the body by the force. Furthermore, the molding has a structure for covering the back surface and the front surface of the front side edge portion of the side window. Therefore, when the force has acted, the molding is caught on the side window, thereby preventing that from being removed from the body.

Furthermore, in recent years, there has been a demand for further improving the beauty by showing the molding slim when seeing around the side window from the outside. Thus, like the cross-section of the molding shown in FIG. 4, there has also been proposed a molding for covering only two surfaces of the side surface and the bottom surface of the side edge portion of the side window, not a molding for covering three surfaces of the bottom surface, the side surface and the top surface of the side edge portion of the side window, such as the molding described in Patent Publication 1.

PRIOR ART PUBLICATIONS

Patent Publications

Patent Publication 1: Japanese Patent Application Publication 2007-223405

SUMMARY OF THE INVENTION

In the case of using the molding described in Patent Publication 1, both of the molding and the side window that is attached to the molding are provided with clips for the positioning and the temporary tacking to the body. Therefore, when the molding and the side window have been attached to the body, it becomes necessary to conduct a fine adjustment of the respective attachment positions of the molding and the side window after attaching them. This has led to the increase of the operation man-hour when assembling the body.

Thus, like the molding that is attached to the front side edge portion of the side window as shown in FIG. 4, it is possible to reduce the operation man-hour, when assembling the body, by a method in which the molding and the side window are previously bonded together by an adhesive prior to the attachment to the body, and then the side window with the molding previously bonded thereto is attached to the body.

However, in case that the molding is a molding covering only the bottom surface and the side surface of the front side edge portion of the side window as shown in FIG. 4, the following problem may occur. It is a problem that, when the door lip formed on the molding has been brought into abutment with and pressed by the weather strip attached to the door panel of the door upon closing the door, the force generates a force to bend the glass support member of the molding towards the vehicle interior, thereby causing a possibility that the molding is removed from the front side edge portion of the side window to come out of the side window. Furthermore, as another problem, even in case that the molding does not come out, there is also mentioned as the point the possibility that a gap is generated between the molding and the side surface of the side window by the force and damages the beauty.

The present invention aims to solve these points. That is, it is an object to provide a molding that is attached to the front side edge portion of a vehicle side window, the molding covering only the side surface and the bottom surface of the side window, being able to be attached without increasing the operation man-hour when assembling the body, and being able to prevent the molding from coming out of the side window.

According to the present invention, there is provided a molding (first molding) that is attached to a front side edge portion of a vehicle side window and covers only the bottom surface and the side surface of the side window, the molding being formed with a door lip for covering an inclined portion of a body opening portion between a glass attachment surface of the body of the vehicle, to which the side window is attached, and a flat portion of a body opening portion, to which a door of the vehicle is attached, the molding being characterized by that a tip portion of the door lip of the molding is bent towards the inclined portion of the body opening portion to form a body abutment portion.

The first molding may be a molding (second molding) characterized by that a tip portion of the body abutment portion of the molding is bent in a direction in which the side window is positioned, to make a bent portion of the body abutment portion.

The first or second molding may be a molding (third molding) characterized by that a groove is formed in a longitudinal direction of the molding on a back surface of a glass support member of the molding that bonds a back surface of the front side edge portion of the side window.

Furthermore, according to the present invention, there is provided a method for attaching a side window with the molding attached thereto, which is characterized by that, when the side window with the third molding attached thereto is attached to a glass attachment surface of the body, an adhesive applied on a back surface of the side window is pressed between the side window and the glass attachment surface and thereby extended so that a part of the adhesive penetrates into the groove formed on the glass support member of the molding.

Advantageous Effect of the Invention

A vehicle molding of the present invention is a molding that is attached to a front side edge portion of a side window of a vehicle body. It is a molding formed with a door lip that, when a vehicle door has been closed, a weather strip attached to a peripheral portion of a door panel of the door is brought into abutment with the door lip. In the molding of the present invention, a tip portion of the door lip is bent to form a body abutment portion that is brought into abutment with an inclined portion of the body opening portion. Thereby, when the weather strip is in abutment with the door lip, the body abutment portion of the door lip applies force against the inclined portion of the body opening portion. Therefore, its reaction force makes a force act on the glass support member of the molding in the direction of the glass attachment surface of the body. Thus, it is possible to prevent the removal of the side window and the molding and the molding from coming off the side window.

DETAILED DESCRIPTION

<Structure of the Molding of the Present Invention>

Figure 1:
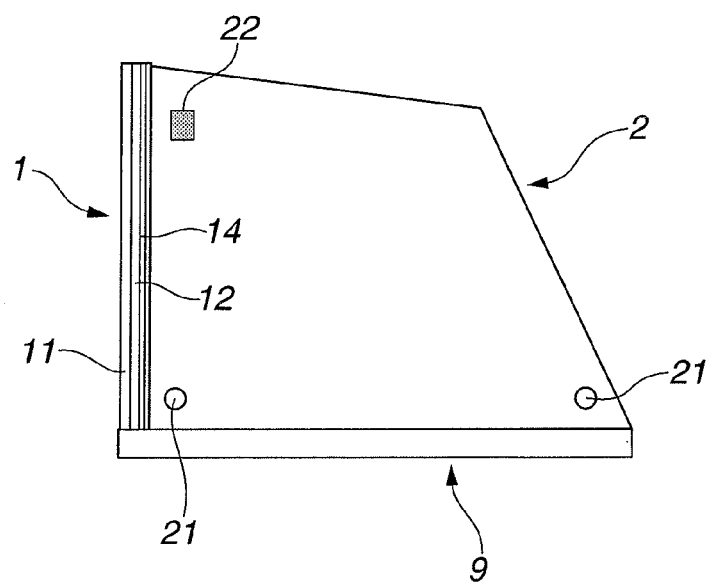
FIG. 1 is a view showing a condition in which, when a molding according to Example 1 has been attached to the front side edge portion of a side window, the side window is seen from the back side.

For example, like molding 1 of FIG. 1, the molding of the present invention is attached to a front side edge portion of a side window 2. FIG. 1 is a view showing the body attachment surface side of the side window 2. To ease positioning when attaching the side window to the body, as shown in FIG. 1, locating pins 21 and a fastener 22 are attached in some cases. Furthermore, as shown in FIG. 1, in some cases, a bottom edge molding 9 is attached to the bottom edge too, besides the side edge portion of the side window. Those showing cross-sections around the molding 1 of FIG. 1 are FIG. 2 and FIG. 3.

Figure 2:
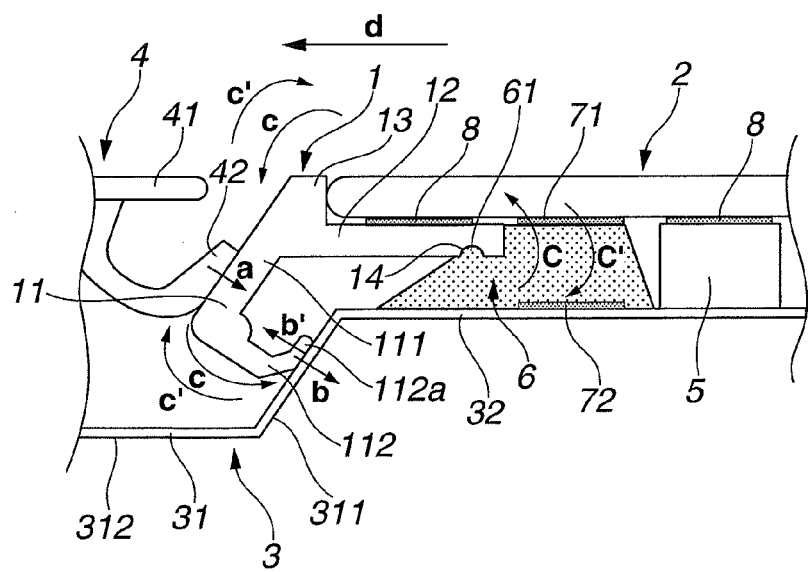
FIG. 2 is a cross-sectional view showing around the molding, when the side window with the molding according to Example 1 attached thereto has been attached to a glass attachment surface of the body.

As shown in FIG. 2, the molding 1 of the present invention is attached to a front side edge portion of the side window 2. Upon this, a glass attachment surface 32 of a body 3, to which the side window 2 with the molding 1 of the present invention attached thereto is attached, is positioned adjacent to the door 4 of the vehicle. Furthermore, a body opening portion 31, to which the door 4 is attached, is formed inside in terms of the vehicle width of the body 3 relative to the glass attachment surface 32. An inclined step is formed between a flat portion 312 of the body opening portion and the glass attachment surface 32. The step is called an inclined portion 311 of the body opening portion. Furthermore, herein, relative to the molding 1 and the side window 2, the side of the glass attachment surface 32 of the body 3 is called the back surface, and the opposite side is called the front surface.

The molding 1 of the present invention is produced by extruding a resin such as PVC. The molding 1 is made up of a glass support member 12 that supports the back surface of the front side edge portion of the side window 2, a trim 13 that is brought into abutment with the side surface of the front side edge of the side window 2, and a door lip 11 that is extended from the trim 13 towards the flat portion 312 of the body opening portion.

The door lip 11 is made up of a weather strip abutment portion 111 with which a weather strip 42 attached to a peripheral portion of a door panel 41 of the door 4 is brought into abutment when the door 4 is closed as shown in FIG. 2, and a body abutment portion 112 that is bent from the weather strip abutment portion 111 towards the inclined portion 311 of the body opening portion. Furthermore, it is optional to form a bent portion 112a of the body abutment portion by bending a tip portion of the body abutment portion 112 towards the glass support member 12. The body abutment portion 112 made of a paraffin-containing resin improves a slide relative to the body. Therefore, it is preferable.

The body abutment portion 112 of the door lip 11 may be formed to be thinner than the weather strip abutment portion 111 and may be formed by a material softer than that of the weather strip abutment portion 111.

The glass support member 12 is normally a flat platy body, but its back surface may be formed with a groove 14 in the longitudinal direction of the molding 1. Furthermore, it is preferable that the back surface of the glass support member 12 is made of a paraffin-containing resin. With this, even if the back surface of the glass support member 12 is brought into abutment with the glass attachment surface 32 and is rubbed against the glass attachment surface 32, abnormal noise does not occur due to a good slide.

<When Attaching the Molding of the Present Invention to the Front Side Edge Portion of the Side Window>

As shown in FIG. 2, a double-sided tape 8 is put on the surface of a glass support member 12 of the molding 1, and the side window 2 is placed on the double-sided tape 8 so that the side surface of the front side edge of the side window 2 is brought into abutment with the trim 13 of the molding 1. It is, however, not always necessary to use the double-sided tape 8 for the adhesion between the glass support member 12 and the side window 2. It is optional to apply a primer onto the surface of the glass support member 12 and the back surface of the front side edge portion of the side window 2 and then stick them together by an adhesive.

<Method for Attaching the Side Window with the Molding of the Present Invention Attached Thereto, to the Body>

Figure 3:
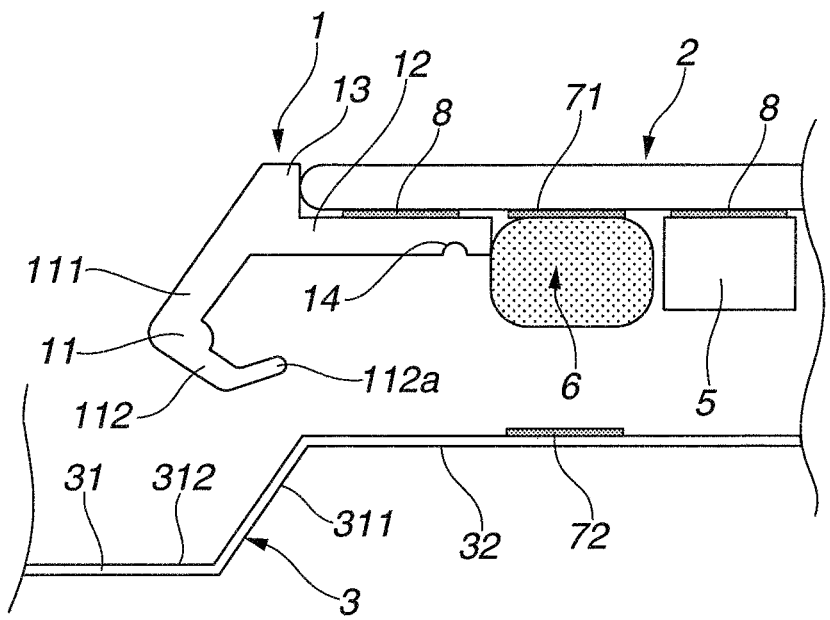
FIG. 3 is a cross-sectional view showing around the molding, when the side window with the molding according to Example 1 attached thereto is attached to a glass attachment surface of the body.

FIG. 3 is a cross-sectional view showing a condition when attaching the side window 2 with the molding 1 of the present invention attached thereto, to the glass attachment surface 32 of the body 3.

When the side window 2 is attached to the glass attachment surface 32 of the body, a dam rubber 5 is previously stuck on a peripheral portion of the side window by a double-sided tape 8. A primer is applied to a peripheral portion on the outside of the dam rubber 5 of the side window 2 to form a glass side, primer-applied layer 71. A urethane adhesive 6 is applied on the glass side, primer-applied layer 71 along a peripheral portion of the side window 2. In a region where the molding 1 of the front side edge portion of the side window 2 is attached, the glass side, primer-applied layer 71 is formed in a region interposed between the molding 1 and the dam rubber 5. Furthermore, a primer is also applied onto the glass attachment surface 32 of the body 3 so as to correspond to the peripheral portion of the side window 2, thereby forming a body side, primer applied layer 72.

When the side window 2 is attached to the glass attachment surface 32 of the body 3, the side window 2 is attached straight to the glass attachment surface 32 with the least possible movement from side to side. Therefore, the body abutment portion 112 of the door lip 11 of the molding 1 is brought into abutment with the inclined portion 311 of the body opening portion.

Therefore, a tip portion of the body abutment portion 112 of the door lip 11 can be bent towards the position of the side window 2 to form a bent portion 112a of the body abutment portion. With this, when the bent portion 112a of the body abutment portion has been brought into abutment with the inclined portion 311 of the body opening portion, it is easily bent towards the position of the side window 2. Therefore, when the side window 2 is attached to the glass attachment surface 32, the force from the inclined portion 311 of the body opening portion does not generate a force that removes the glass support member 12 of the molding 1 and the side window 2.

Furthermore, the body abutment portion 112 can be made thin in its thickness or formed by a soft material. With this, when it has been brought into abutment with the inclined portion 311 of the body opening portion, it is more easily bent. Therefore, it becomes possible to smoothly conduct the attachment of the side window 2 to the glass attachment surface 32. The body abutment portion 112 is, however, required to have a thickness and a hardness to be proof against a certain degree of pushing force as mentioned hereinafter. Therefore, it is necessary to carefully determine the design condition.

Furthermore, the body abutment portion 112 can be formed by a paraffin-containing resin. With this, when it has been brought into abutment with the inclined portion 311 of the vehicle opening portion, there is improved a slide between the body abutment portion 112 and the inclined portion 311 of the vehicle opening portion. Therefore, it becomes possible to more smoothly conduct the attachment of the side window 2 to the glass attachment surface 32.

Furthermore, from FIG. 2, when the side window 2 has been attached to the glass attachment surface 32 of the body 3, the urethane adhesive 6 is held between the side window 2 and the glass attachment surface 32. Therefore, it extends sideways, and a part of that penetrates into the groove 14 formed on the back side of the glass support member 12 of the molding 1 to form a groove-penetrated, adhesive portion 61. After the groove-penetrated, adhesive portion 61 solidifies, the molding 1 is caught at the groove 14 by the groove-penetrated, adhesive portion 61. Therefore, even if a force is added to the molding 1 in the direction of arrow "d", it can be prevented from coming out of the side window 2.

<Effect of the Body Abutment Portion Formed on the Door Lip of the Molding>

As shown in FIG. 2, when the side window 2 with the molding 1 attached thereto has been attached, and when the door has been closed, the weather strip 42 attached to a peripheral portion of the door panel 41 of the door 4 is brought into abutment with the weather strip abutment portion 111 of the door lip 11 of the molding 1 to add a force against the weather strip abutment portion 111 in the direction of arrow "a".

When the force is added to the weather strip abutment portion 111 in the direction of arrow "a", a force acts on the molding 1 to generate a rotation like arrow "c". Therefore, there is generated a force for bending the glass support member 12 of the molding 1 towards the vehicle interior. With this, the glass support member 12 tends to come off the bottom surface of the front side edge portion of the side window 2. Furthermore, the door lip 11 also tends to be bent towards the vehicle inside. Following this, there is a tendency to generate a gap between the trim 13 and the side window 2.

However, since the body abutment portion 112 of the door lip 11 is brought into abutment with the inclined portion 311 of the body opening portion to add a force in the direction of arrow "b", a reaction force is generated in the direction of arrow b'. By this reaction force, there is generated a rotation in the direction of arrow c', which is opposite to arrow "c". Therefore, it prevents the glass support member 12 from coming off the bottom surface of the front side edge portion of the side window 2 and prevents the generation of a gap between the trim 13 and the side surface of the front side edge portion of the side window 2.

Figure 4:
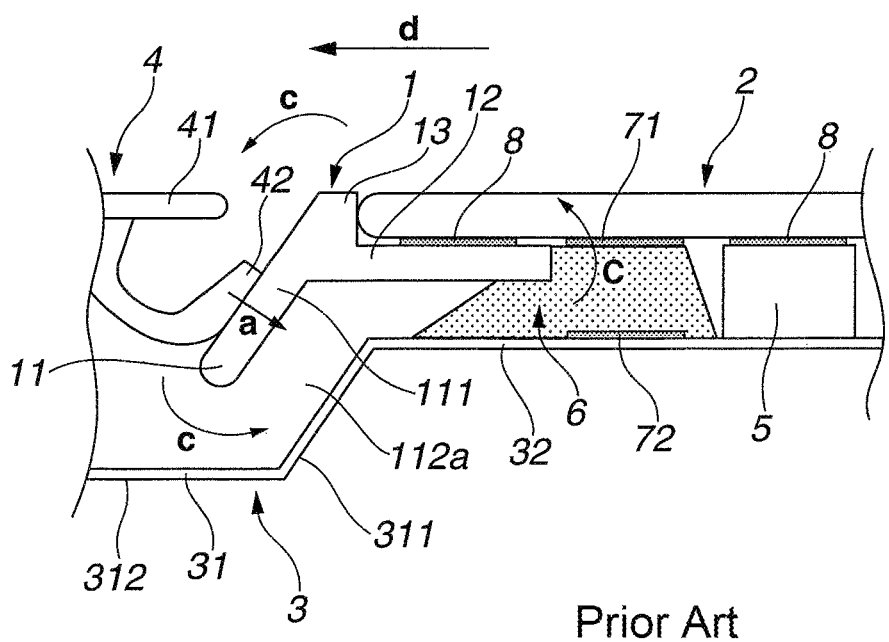
FIG. 4 is a cross-sectional view showing around the molding, when the side window with a molding according to a conventional example attached thereto is attached to a glass attachment surface of the body.

On the other hand, in case that the door lip 11 of the molding 1 is not formed with the body abutment portion 112 like a conventional example shown in FIG. 4, when a force is added to the weather strip abutment portion 111 in the direction of arrow "a", a force acts on the molding 1 to generate a rotation like arrow "c". Therefore, a force is generated to bend the glass support member 12 of the molding 1 towards the vehicle inside. With this, the glass support member 12 tends to come off the bottom surface of the front side edge portion of the side window 2. Furthermore, the door lip 11 also tends to be bent towards the vehicle inside. With this, a gap tends to occur between the trim 13 and the side edge of the front side edge portion of the side window 2.

Therefore, as repeating the opening and closing of the door, it is repeated that a force is added and is not added between the glass support member 12 of the molding 1 and the side window 2. Therefore, it causes a possibility that an adhesive strength between the glass support member 12 and the side window 2 becomes weak, that the adhesive strength is gradually lost, and that the molding 1 comes off and falls off the side window 2. Furthermore, there is a possibility that the trim 13 generates a gap between the front side edge of the side window 2 and the trim 13 by a force generating a rotation of arrow "c", thereby also generating a problem that beauty is damaged.

EXAMPLES

In the following, an example of the present invention is explained.

Example 1

Structure of Molding of Example 1

FIG. 3 is a cross-sectional view of around the molding 1, showing a condition in which it is tried to attach the side window 2 with the molding of Example 1 of the present invention attached thereto, to the glass attachment surface 32 of the body 3.

As shown in FIG. 3, the molding 1 of Example 1 is attached to the front side edge portion of the side window 2. Upon this, the glass attachment surface 32 of the body 3, to which the side window 2 with the molding 1 of Example 1 attached thereto is attached, is positioned adjacent to the door 4 of the vehicle. Furthermore, the body opening portion 31, to which the door is attached, is formed inside in terms of the vehicle width of the body 3 relative to the glass attachment surface 32.

An inclined step is formed between the flat portion 312 of the body opening portion and the glass attachment surface 32. The step is called an inclined portion 311 of the body opening portion.

The molding 1 of Example 1 is produced by extruding PVC. The molding 1 is made up of the glass support member 12 having a surface that is adhered to the back surface of the front side edge portion of the side window 2, the trim 13 that is brought into abutment with the side surface of the front side edge of the side window 2, and the door lip 11 that is extended from the trim 13 towards the flat portion 311 of the body opening portion.

The door lip 11 is made up of a weather strip abutment portion 111 with which a weather strip 42 attached to a peripheral portion of a door panel 41 of the door 4 is brought into abutment when the door 4 is closed as shown in FIG. 2, and a body abutment portion 112 that is bent from the weather strip abutment portion 111 towards the inclined portion 311 of the body opening portion. Furthermore, a bent portion 112a of the body abutment portion is formed by bending a tip portion of the body abutment portion 112 towards the glass support member 12. The body abutment portion 112 is made of a paraffin-containing resin, thereby improving a slide when it is brought into abutment with the inclined portion 311 of the body opening portion.

Furthermore, the body abutment portion 112 of the door lip 11 was made to have a thickness of about 1 mm and a hardness of about 70 degrees, thereby providing an elasticity so that it bend suitably, when attaching the side window 2 to the glass attachment surface 32 of the body 3, and demonstrating a suitable rigidity when the weather strip abutment portion of the door lip 11 has been pressed by the weather strip 42 attached to the door panel 41.

Furthermore, the glass support member 12 was formed on its back surface with a groove 14 in the longitudinal direction of the molding 1. Furthermore, the back surface of the glass support member 12 was constituted of a paraffin-containing resin. Therefore, even if the back surface of the glass support member 12 is brought into abutment with the glass attachment surface 32 to slide on the glass attachment surface 32, the slide is improved. Therefore, the occurrence of abnormal noise is prevented.

[Method for Attaching the Side Window with the Molding of Example 1 Attached Thereto, to the Body]

As shown in FIG. 3, a double-sided tape 8 is put on the surface of the glass support member 12 of the molding 1, and the side window 2 is placed on the double-sided tape 8 so that the front side edge of the side window 2 is brought into abutment with the trim 13 of the molding 1.

When the side window 2 is attached to the glass attachment surface 32 of the body 3, a dam rubber 5 is previously stuck on a peripheral portion of the side window 2 by a double-sided tape 8. A primer is applied to a peripheral portion on the outside of the dam rubber 5 of the side window 2 to form a glass side, primer-applied layer 71. A urethane adhesive 6 is applied on the glass side, primer-applied layer 71 along a peripheral portion of the side window 2. In a region where the molding 1 of the front side edge portion of the side window 2 is attached, the glass side, primer-applied layer 71 is formed in a region interposed between the molding 1 and the dam rubber 5. Furthermore, a primer is also applied onto the glass attachment surface 32 of the body 3 so as to correspond to the peripheral portion of the side window 2, thereby forming a body side, primer applied layer 72.

FIG. 1 shows a condition in which the side window 2 is viewed from the back side when the molding 1 of Example 1 has been attached to the front side edge portion of the side window 2. In the side window 2 with the molding of Example 1 attached thereto, a bottom edge molding 9 is clamped on the bottom edge of the side window not shown in the drawings. Furthermore, in order to smoothly conduct positioning when attaching the side window 2 to the glass attachment surface 32 of the body 3, locating pins are bonded to two positions on the bottom edge portion of the side window 2, and a fastener 22 is bonded to one position of the top edge portion of the side window 2. Positioning holes not shown in the drawings are formed on the glass attachment surface 32 of the body 3 in order to insert the locating pins 22 at positions corresponding to the locating pins 22 at two positions, which have been previously bonded to the side window 2. Furthermore, a fastener not shown in the drawings is bonded to the position corresponding to the fastener 22 bonded to the side window 2.

When attaching the side window 2 to the glass attachment surface 32 of the body 3, the positions of the locating pins 21 and the fastener 22, which have been bonded to the side window 2, are respectively matched with the positioning holes and the fastener, which have been formed on the glass attachment surface 32 of the body 3. Then, the side window 2 is attached straight to the glass attachment surface 32 with the least possible movement from side to side.

Upon this, the body abutment portion 112 of the door lip 11 of the molding 1 is brought into abutment with the inclined portion 311 of the body opening portion. The body abutment portion 112 is formed with the bent portion 112a of the body abutment portion. Therefore, when the body abutment portion 112 is brought into abutment with the inclined portion 311 of the body opening portion and then pressed towards the inside of the body, it is possible by a force acting on the body abutment portion 112 from the inclined portion 311 of the body opening portion to prevent the occurrence of a force in the direction to remove the glass support member 12 of the molding 1 and the side window 2. Furthermore, the body abutment portion 112 is adjusted in terms of its hardness and thickness to obtain a suitable softness, and is formed by a paraffin-containing material. Therefore, when it is pressed towards the inside of the body along the inclined portion 311 of the body opening portion, the slide is improved. Thereby, it is possible to smoothly conduct an operation of attaching the side window 2 to the glass attachment surface 32 of the body 3.

FIG. 2 is a cross-sectional view of around the molding 1, showing a condition in which the side window 2 with the molding of Example 1 of the present invention attached thereto has been attached to the glass attachment surface 32 of the body 3. From FIG. 2, when the side window 2 has been attached to the glass attachment surface 32 of the body 3, the urethane adhesive 6 is held between the side window 2 and the glass attachment surface 32. Therefore, it extends sideways, and a part of that penetrates into the groove 14 formed on the back side of the glass support member 12 of the molding 1 to form a groove-penetrated, adhesive portion 61. After the groove-penetrated, adhesive portion 61 solidifies, the molding 1 is caught at the groove 14 by the groove-penetrated, adhesive portion 61. Therefore, even if a force is added to the molding 1 in the direction of arrow "d", it can be prevented from coming out of the side window 2.

[Effect of the Body Abutment Portion Formed on the Door Lip of the Molding of Example 1]

As shown in FIG. 2, when the side window 2 with the molding attached thereto has been attached, and when the door has been closed, the weather strip 42 attached to a peripheral portion of the door panel 41 of the door 4 is brought into abutment with the weather strip abutment portion 111 of the door lip 11 of the molding 1 to add a force in the direction of arrow "a".

When the force is added to the weather strip abutment portion 111 in the direction of arrow "a", a force acts on the molding 1 to generate a rotation like arrow "c". Therefore, there is generated a force for bending the glass support member 12 of the molding 1 towards the vehicle interior. With this, the glass support member 12 tends to come off the bottom surface of the front side edge portion of the side window 2. Furthermore, the door lip 11 also tends to be bent towards the vehicle inside. Following this, there is a tendency to generate a gap between the trim 13 and the side window 2.

However, since the body abutment portion 112 of the door lip 11 is brought into abutment with the inclined portion 311 of the body opening portion to add a force in the direction of arrow "b", a reaction force is generated in the direction of arrow b'. By this reaction force, there is generated a rotation in the direction of arrow c', which is opposite to arrow "c". Therefore, it prevents the glass support member 12 from coming off the bottom surface of the front side edge portion of the side window 2 and prevents the generation of a gap between the trim 13 and the side surface of the front side edge portion of the side window 2.

As above, a preferable embodiment has been described. The present invention is not limited to this, but various applications are considered.

Conventional Example

FIG. 4 is a cross-sectional view of around the molding 1, showing a condition in which the side window 2 with a molding of a conventional example attached thereto has been attached to the glass attachment surface 32 of the body 3. As shown in FIG. 4, in case that the door lip 11 of the molding 1 is not formed with the body abutment portion 112, when a force is added to the weather strip abutment portion 111 in the direction of arrow "a", a force acts on the molding 1 to generate a rotation like arrow "c". Therefore, a force is generated to bend the glass support member 12 of the molding 1 towards the vehicle inside. With this, the glass support member 12 tends to come off the bottom surface of the front side edge portion of the side window 2. Furthermore, the door lip 11 also tends to be bent towards the vehicle inside. With this, a gap tends to occur between the trim 13 and the side surface of the front side edge portion of the side window 2.

Therefore, as repeating the opening and closing of the door, it is repeated that a force is added and is not added between the glass support member 12 of the molding 1 and the side window 2. Therefore, it causes a possibility that an adhesive strength between the glass support member 12 and the side window 2 becomes weak, that the adhesive strength is gradually lost, and that the molding 1 comes off and falls off the side window 2. Furthermore, there is a possibility that the trim 13 generates a gap between the front side edge of the side window 2 and the trim 13 by a force generating a rotation of arrow "c", thereby also generating a problem that beauty is damaged.

EXPLANATION OF SYMBOLS

1: a molding
11: a door lip
111: a weather strip abutment portion
112: a body abutment portion
112a: a bent portion of the body abutment portion
12: a glass support member
13: a trim
14: a groove
2: a side window
21: a locating pin
22: a fastener
3: a body
31: a body opening portion
311: an inclined portion of the body opening portion
312: a flat portion of the body opening portion
32: a glass attachment surface
4: a door
41: a door panel
42: a weather strip
5: a dam rubber
6: a urethane adhesive
61: a groove-penetrated, adhesive portion
71: a glass side, primer-applied layer
72: a body side, primer-applied layer
8: a double-sided tape
9: a bottom edge molding
a: the direction of a pressing force when the weather strip presses the door lip when the door has been closed
b: the direction of a force by which the body abutment portion of the door lip presses the inclined portion of the body opening portion by a pressing force when the weather strip has pressed the door lip
b': the direction of a reaction force occurring when the body abutment portion of the door lip has pressed the inclined portion of the body opening portion
c: the direction of a rotation occurring on the molding by a pressing force when the weather strip has pressed the door lip
c': the direction of a rotation occurring on the molding by a reaction force occurring when the body abutment portion of the door lip has pressed the inclined portion of the body opening portion
d: the direction in which the molding is pulled

The invention claimed is:

1. A molding that is attached to a front side edge portion of a side window of a vehicle and is brought into abutment with only a bottom surface and a side surface of the side window, the molding being formed with a door lip for covering an inclined portion of a body opening portion between a glass attachment surface of a body of the vehicle, to which the side window is attached, and a flat portion of the body opening portion, to which a door of the vehicle is attached,
  wherein the door lip of the molding includes:
    a weather strip abutment portion arranged to be brought into abutment with a weather strip attached to a peripheral portion of a door panel of the door when the door is at a closed position; and
    a body abutment portion extending from the weather strip abutment portion, the body abutment portion turning from the weather strip abutment portion towards the inclined portion of the body opening portion and being arranged to be brought into abutment with the inclined portion of the body opening portion.

2. The molding as claimed in claim 1, wherein a tip portion of the body abutment portion of the molding is bent in a direction in which the side window is positioned, to make a bent portion of the body abutment portion.

3. The molding as claimed in claim 1, wherein a groove is formed in a longitudinal direction of the molding on a back surface of a glass support member of the molding that bonds a back surface of the front side edge portion of the side window.

4. A method for attaching a side window with the molding according to claim 3 attached thereto, comprising the steps of:
applying an adhesive on a back surface of the side window with the molding according to claim 3; and
after applying the adhesive, attaching the side window with the molding according to claim 3 to a glass attachment surface of the body such that the adhesive applied on the back surface of the side window is pressed between the side window and the glass attachment surface and thereby extended so that a part of the adhesive penetrates into the groove formed on the glass support member of the molding.

5. A method for attaching a side window with the molding according to claim 1 attached thereto, comprising the step of:
attaching the side window with the molding according to claim 1 to the glass attachment surface of the body such that when the weather strip attached to a peripheral portion of the door panel of the door is brought into abutment with the door lip of the molding, the body abutment portion formed on the door lip is brought into abutment with the inclined portion of the body opening portion, resulting in that a glass support member of the molding configured for bonding a back surface of a front side edge portion of the side window is prevented from coming off the side window by a reaction force receiving from the inclined portion of the body opening portion.

6. A method for attaching a side window with the molding according to claim 1 attached thereto, comprising the step of:
attaching the side window with the molding according to claim 1 to the glass attachment surface of the body such that when the weather strip attached to the peripheral portion of the door panel of the door of the vehicle is brought into abutment with the door lip of the molding, the body abutment portion formed on the door lip is brought into abutment with the inclined portion of the body opening portion, generation of a gap between a trim of the molding and a side surface of a front side edge portion of the side window is prevented.

7. The molding as claimed in claim 1, wherein the weather strip abutment portion of the door lip includes a flat surface for carrying thereon the weather strip of the door when the door is closed.

* * * * *